July 16, 1929.  A. P. GUSTAFSON  1,720,834
AUTOMOBILE SIGNAL
Filed Oct. 11, 1928  2 Sheets-Sheet 1

INVENTOR.
Adolph P. Gustafson
BY Brayton Richards
ATTORNEY.

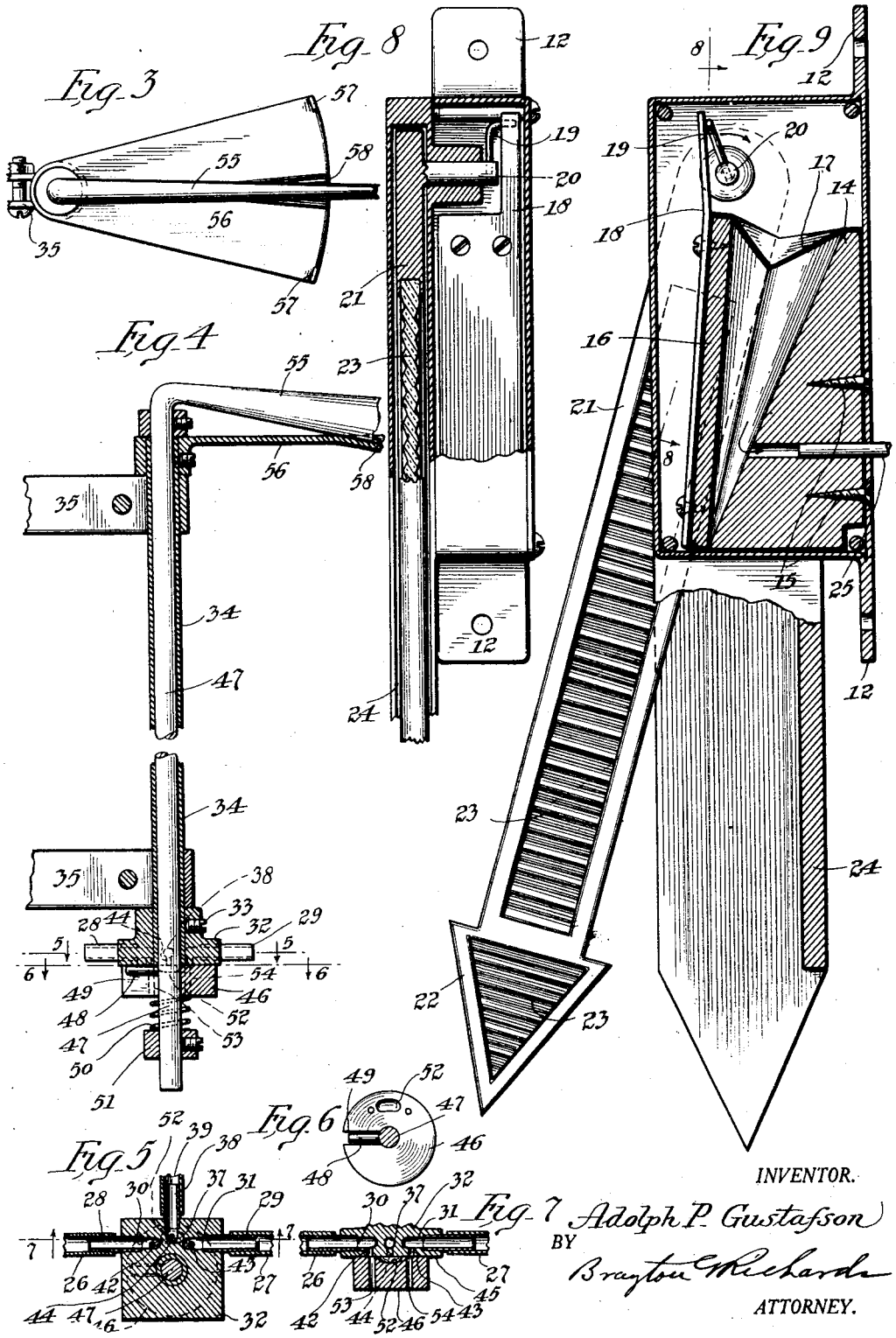

Patented July 16, 1929.

1,720,834

UNITED STATES PATENT OFFICE.

ADOLPH P. GUSTAFSON, OF CHICAGO, ILLINOIS, ASSIGNOR OF ONE-HALF TO HARRY GOLDSTINE, OF CHICAGO, ILLINOIS.

AUTOMOBILE SIGNAL.

Application filed October 11, 1928. Serial No. 311,855.

The invention relates to improvements in automobile signals, and has for its object the provision of an improved construction of this character which is of simple construction and highly efficient in use.

Another object of the invention is the provision of an improved construction of this character which is automatically operated from the engine of the automobile, and is strong and durable in use.

Another object of the invention is the provision of an improved valve arrangement for operating such signals.

Other objects will appear hereinafter.

The invention consists in the combinations and arrangements of parts hereinafter described and claimed.

Figure 1:
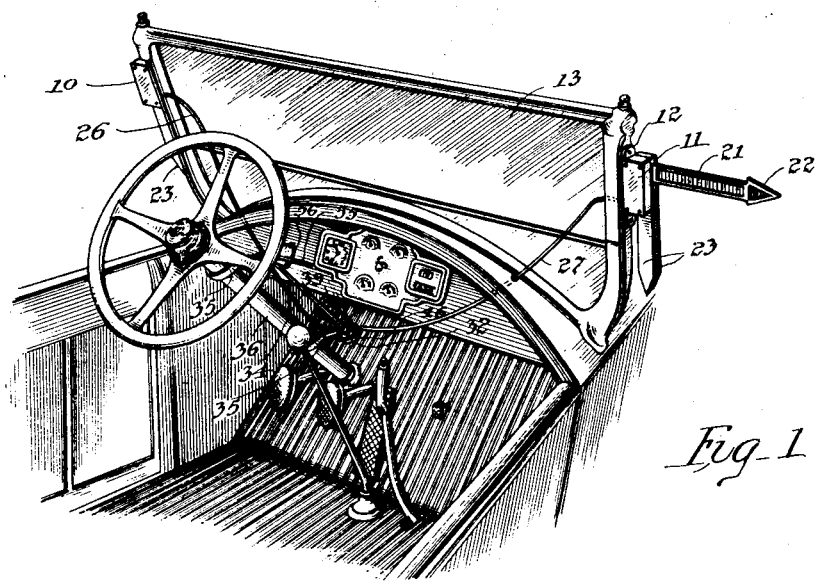

The invention will be best understood by reference to the accompanying drawings forming a part of this specification, and in which Fig. 1 is a perspective view showing the signal in use on an automobile.

Figure 2:
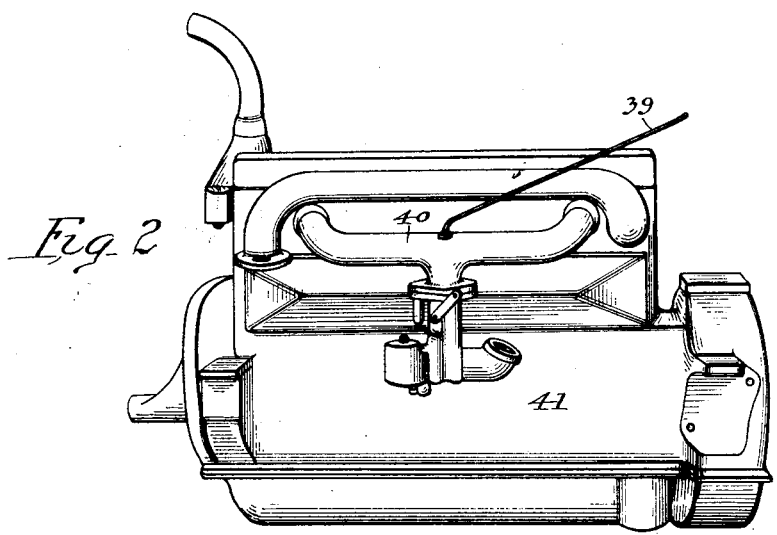

Fig. 2, a perspective view illustrating the connection of the signal with the engine of the automobile.

Fig. 3, a top plan view showing the mounting of an operating shaft for a control valve of the device.

Fig. 4, a vertical section of said mounting.

Fig. 5, a section taken substantially on line 5—5 of Fig. 4.

Fig. 6, a section taken substantially on line 6—6 of Fig. 4.

Fig. 7, a section taken substantially on line 7—7 of Fig. 5.

Fig. 8, a detail view of one of two signal arms employed in the device, said view being taken substantially on line 8—8 of Fig. 9, and Fig. 9, a vertical section at right angles to Fig. 8.

The preferred form of construction as illustrated in the drawings comprises two signal casings 10 and 11, each provided with perforated ears, or lugs, 12, by means of which the same is secured to the side frame of the windshield 13 of the automobile, or the like. Each of said casings 10 and 11 contains a pneumatic element in the form of a bellows having a stationary block or base 14, secured by screws 15 to the inner wall of the casing. Said bellows also comprises a moveable swinging wall, or side, 16 and cooperating therewith the usual flexible bellows member 17, folded as indicated to constitute the usual bellows arrangement. The moveable bellows wall 16 carries an operating bar 18 projecting upwardly therefrom into cooperative relationship with a crank arm 19 on the shaft 20 of a signal arm 21, mounted as shown in said casing, there being slots in the side and bottom of the casing to permit of free upward and outward swinging of said signal arm on its shaft 20. Each of the casings 10 and 11 is provided with one of the signal arms 21, adapted to swing upwardly and outwardly therefrom, as will be readily understood. Each signal arm 21 is provided at its lower end with a spear, or arrow head 22 and both the body and head of this signal arm are provided with a double-faced corrugated reflector 23, preferably of red glass, and arranged and adapted to reflect red light in both directions at night, as will be readily understood. As shown, each signal arm is inclosed in the protecting housing 24 arranged as part of the casing 11 and attached to the forward side thereof and projecting well below the bottom thereof. Each of the housings 24 is open on its outer side and bottom permitting the free outward swing of the enclosed signal arm and preventing the accumulation of dirt or moisture therein. By this arrangement it will be noted that upon exhaustion of the air from the corresponding bellows, the corresponding signal arm 21 will be swung upwardly and outwardly from its casing to indicate the direction in which the automobile is to be turned or steered.

Each bellows is provided with an inwardly projecting air tube, or nipple 25, projecting inwardly from the adjoining side of the windshield frame, and the nipple 25 on the bellows in the casing 10 is connected with one end of a rubber tube 26, the nipple on the other bellows being connected with one end of a rubber tube 27. The rubber tubes 26 and 27 have their other ends connected respectively with nipples, or tubes, 28 and 29, which lead into air passages 30 and 31 of a valve head 32, secured by a set screw 33 to the lower end of a tubular support, or bearing, 34, mounted in brackets 35 on a steering column, or post, 36 of the automobile. Another air passage 37 in the valve head 32 is connected with a nipple 38, which is connected by a rubber tube 39 with the intake manifold 40 of the engine 41 of the automobile. A bore 42 leads downwardly from the air passage 30 and a similar bore 43 leads downwardly from the air passage 31. A third bore 44 leads downwardly from the air passage 37. The bores 42 and 43, as well as the bore 44, open downwardly through the surface 45 of the valve head 32, said surface 45 being finished to constitute a valve surface. A valve 46 is mounted on the lower end of an operating shaft 47, mounted to rotate in the tubular support 34. The connection between the valve 46 and the shaft 47 is effected by means of a pin 48 resting loosely in a slot 49 in said valve 46, whereby a splined connection is effected, which permits of seating of the valve 46 on the finished surface 45. The valve 46 is yieldingly held to its seat by means of an operative spring 50 abutting against a collar 51, secured as shown, to said shaft 47. The valve 46 is provided with a central valve recess, or passageway, 52, and with air escape ports 53 and 54, arranged as shown. The arrangement is such that when the valve 46 is in its central, or medial, position, the end of the tube 39 is closed and the engine operates in its normal way without interference from the signal device. When the valve 46 is shifted to either side, however, either the port 42 or the port 43 is thrown into communication by the recess 52 with central port 44, so that the corresponding bellows will be subjected to the vacuum normally produced in the intake manifold 40 by the normal operation of the engine 41, and whereby the corresponding bellows will be operated to operate the corresponding signal arm 21 to indicate the intention of the driver of the automobile. When the valve 46 is returned to central position, the ports 53 and 54 will be brought into operative association with the ports 42 and 43, thereby admitting air to the exhausted bellows, and relieving the vacuum therein, thus permitting the signal arm to return to normal position through its own weight. By this arrangement, it will be noted, that the driver of the automobile may readily indicate his future intentions in driving the car by manipulating the valve 46, as above described.

To facilitate the manipulations of the valve 46, the shaft 47 is provided with an operating arm 55 at its upper end adjacent the steering wheel of the automobile, as shown in Fig. 1. The operating arm 55 cooperates with a plate 56 secured to the upper end of the support 34, and having stops 57 at each corner to limit the lateral swinging of said arm 55. The plate 56 is also provided with a central recess 58, adapted to receive the arm 55 when in central position, in which position said arm 55 is yieldingly held by the action of the spring 50, as will be readily understood. When it is desired to shift the valve 46, the handle arm 55 may be readily manipulated, as desired to do so.

While I have illustrated and described the preferred form of construction for carrying my invention into effect, this is capable of variation and modification without departing from the spirit of the invention. I therefore do not wish to be limited to the precise details disclosed, but desire to avail myself of such variations and modifications as fall within the scope of the appended claims:

Having thus fully described my invention, what I claim as new and desire to secure by Letters Patent is:

1. In a signal device of the class described the combination of a tubular support; an operating shaft extending through said support; an operating handle at one end of said shaft; a valve at the other end of said shaft; and a pneumatic signal means controlled by said valve.

2. In a signal device of the class described, a tubular support, adapted and arranged to be secured to the steering column of an automobile; an operating shaft extending through said support; an operating handle at the upper end of said shaft and projecting laterally from said tubular support; a plate at the upper end of said support immediately below and adjacent said handle, said plate being provided with a central recess to receive said handle and with stops to limit the lateral swing of said handle; a valve head at the lower end of said support; a valve splined on said shaft and seating against the lower face of said valve head; a spring on said shaft holding said valve to its seat; and a pneumatic signal operatively connected with said valve head, there being suitable ports and passages in said valve and valve head.

3. A signal member comprising a casing; a housing attached to one side of said casing and depending therefrom, the outer side and bottom of said housing being open; a signal arm mounted in said housing and arranged to swing upwardly and outwardly thru the open side thereof; a shaft for mounting said signal arm in said housing, said shaft extending into said casing; and means in said casing for operating said shaft to swing said signal arm.

4. A signal member comprising a casing; a housing attached to one side of said casing and depending therefrom, the outer side and bottom of said housing being open; a signal arm mounted in said housing and arranged to swing upwardly and outwardly thru the open side thereof; a shaft for mounting said signal arm in said housing, said shaft extending into said casing; a crank arm on said shaft within said casing; a bellows mounted within said casing and having a movable side; an operating bar on the movable side of said bellows projecting into co-operative relationship with said crank arm and adapted and arranged to operate said crank arm to swing said signal arm upwardly and outwardly from said housing; and means for actuating said bellows.

5. A signal comprising a casing; a signal arm shaft mounted on said casing and projecting thru a wall thereof; a signal arm on the outer end of said shaft; a crank arm on the inner end of said shaft and within said casing; a bellows mounted within said casing and having a movable side; an operating bar on the movable side of said bellows projecting into co-operative relationship with said crank arm and adapted and arranged to operate said crank arm to swing said signal arm upwardly and outwardly from said housing; and means for actuating said bellows.

In witness whereof, I have hereunto set my hand this 25 day of September, 1928.

ADOLPH P. GUSTAFSON.